United States Patent
Kimura et al.

(10) Patent No.: US 11,584,202 B2
(45) Date of Patent: Feb. 21, 2023

(54) VEHICLE DOOR FRAME

(71) Applicant: AISIN CORPORATION, Aichi (JP)

(72) Inventors: Jun Kimura, Kanagawa (JP);
Tetsunori Sakata, Kanagawa (JP)

(73) Assignee: AISIN CORPORATION, Aichi (JP)

( * ) Notice: Subject to any disclaimer, the term of this patent is extended or adjusted under 35 U.S.C. 154(b) by 3 days.

(21) Appl. No.: 17/276,278

(22) PCT Filed: Sep. 18, 2019

(86) PCT No.: PCT/JP2019/036622
§ 371 (c)(1),
(2) Date: Mar. 15, 2021

(87) PCT Pub. No.: WO2020/075464
PCT Pub. Date: Apr. 16, 2020

(65) Prior Publication Data
US 2022/0032748 A1 Feb. 3, 2022

(30) Foreign Application Priority Data

Oct. 10, 2018 (JP) .............................. JP2018-192128

(51) Int. Cl.
*B60J 5/04* (2006.01)
(52) U.S. Cl.
CPC .................. *B60J 5/0468* (2013.01)
(58) Field of Classification Search
CPC ...... B60J 5/0468; B60J 5/0408; B60J 5/0402; B60J 5/0463; E06B 3/32
USPC ..... 296/146.9, 146.2, 146.16, 146.5; 49/280, 49/413, 463
See application file for complete search history.

(56) References Cited

U.S. PATENT DOCUMENTS

| | | | |
|---|---|---|---|
| 5,465,531 A * | 11/1995 | Herrmeyer | B60J 1/16 49/463 |
| 5,676,510 A | 10/1997 | Fischer et al. | |
| 10,226,988 B2 * | 3/2019 | Yoshida | B60J 5/0402 |
| 10,343,625 B2 * | 7/2019 | Grunert | B60R 13/0815 |
| 2001/0005959 A1 * | 7/2001 | Ooe | E05B 81/16 49/280 |

(Continued)

FOREIGN PATENT DOCUMENTS

| | | |
|---|---|---|
| EP | 0708014 A1 | 4/1996 |
| JP | S5524413 U | 2/1980 |

(Continued)

OTHER PUBLICATIONS

International Search Report (PCT/ISA/210) with translation and Written Opinion (PCT/ISA/237) dated Dec. 17, 2019, by the Japanese Patent Office as the International Searching Authority for International Application No. PCT/JP2019/036622.

*Primary Examiner* — D Glenn Dayoan
*Assistant Examiner* — Sunsurraye Westbrook
(74) *Attorney, Agent, or Firm* — Buchanan Ingersoll & Rooney PC (57) ABSTRACT

A vehicle door frame includes a pillar and a bridging member. The bridging member is connected to a lower part of the pillar and extends in a longitudinal direction of a vehicle. The pillar and the bridging member are bonded together by a plurality of weld beads. Each of the weld beads is apart from another weld bead and from an extension line of the another weld bead.

6 Claims, 7 Drawing Sheets

(56) References Cited

U.S. PATENT DOCUMENTS

| | | | |
|---|---|---|---|
| 2004/0130179 A1* | 7/2004 | Masunaga | B60J 5/0402 |
| | | | 296/146.5 |
| 2014/0284961 A1* | 9/2014 | Otake | B60J 5/0455 |
| | | | 296/146.6 |
| 2015/0108785 A1 | 4/2015 | Yokota | |
| 2015/0130216 A1* | 5/2015 | Im | B60J 5/0469 |
| | | | 296/146.2 |
| 2015/0183306 A1 | 7/2015 | Shimizu et al. | |

FOREIGN PATENT DOCUMENTS

| | | |
|---|---|---|
| JP | 2014019273 A | 2/2014 |
| WO | 2013176004 A1 | 11/2013 |

\* cited by examiner

VEHICLE DOOR FRAME

CROSS-REFERENCE TO RELATED APPLICATIONS

This application is a national stage application of International Application No. PCT/JP2019/036622, filed Sep. 18, 2019, which designates the United States, incorporated herein by reference, and which claims the benefit of priority from Japanese Patent Application No. 2018-192128, filed Oct. 10, 2018, the entire contents of which are incorporated herein by reference.

TECHNICAL FIELD

Embodiments described herein relate generally to a vehicle door frame.

BACKGROUND ART

Traditionally, vehicle door frames are known, which include pillars and a waist reinforcement welded together at the rear lower corners.

In such a vehicle door frame, the pillars and the waist reinforcement are welded together at a single location. This may cause difficulty in ensuring the stiffness and strength of the welded part depending on specifications.

An object of the present invention is thus to provide a vehicle door frame that can ensure the stiffness and strength of a welded part at the rear lower corner, for example.

SUMMARY

According to the present invention, for example, a vehicle door frame includes a pillar, and a bridging member connected to a lower part of the pillar and extending in a longitudinal direction of a vehicle. The pillar and the bridging member are bonded together by a plurality of weld beads. The weld beads are each apart from another weld bead and from an extension line of the another weld bead.

In the vehicle door frame, for example, the plurality of weld beads is spaced from each other in at least one of the longitudinal direction and a lateral direction and a vertical direction of the vehicle.

In the vehicle door frame, for example, the pillar has an inner circumference that forms a part of an inner periphery of the vehicle door frame. The bridging member includes a first extension extending toward the inner circumference, and a second extension extending from the first extension across the inner circumference. At least one of the weld beads bonds the pillar and the second extension together.

In the vehicle door frame, for example, the first extension has an end that abuts the inner circumference. At least one of the plurality of weld beads bonds the inner circumference and the end together.

In the vehicle door frame, for example, the first extension is provided with a recess. The recess is adjacent to a front side of the weld bead bonding the pillar and the first extension, and recessed outward in the lateral direction of the vehicle.

In the vehicle door frame, for example, the bridging member is provided with a cutout or a hole. At least one of the weld beads bonds the pillar and an edge of the cutout or an edge of the hole together.

The vehicle door frame includes, for example, a lock bracket separated from the pillar, and to which a locking mechanism is attached. The locking mechanism locks a vehicle door to a vehicle body.

It is made possible to provide the vehicle door frame as above that can ensure the stiffness and strength of the welded part at the rear lower corners, for example.

DESCRIPTION OF EMBODIMENTS

The following will describe exemplary embodiments of the present invention. The features of the embodiments closed cross section to be described below and functions and results (effects) of such features are presented for illustrative purposes only. The present invention can be implemented by other features than those disclosed in the embodiment below. The present invention can attain at least one of the effects (including derivative effects) attainable by the features. Throughout the specification, ordinal numbers are used to distinguish parts, components, parts, positions, directions, and else for ease of discussion, and thus are not intended to indicate any priority or order.

The following will describe a plurality of embodiments including same or like constituent elements. The embodiments can individually attain same or like operations and effects based on the same or like constituent elements. Such same or like constituent elements are assigned with common reference numerals and duplicated descriptions thereof may be omitted.

In the drawings, directions are defined for the sake of convenience. The letter X indicates a forward direction of a vehicle longitudinal direction. The letter Y indicates a rightward direction of a vehicle lateral direction. The letter Z indicates an upward direction of a vehicle vertical direction. The vehicle longitudinal direction, the vehicle lateral direction, and the vehicle vertical direction intersect (are orthogonal to) one another.

First Embodiment

Figure 1:
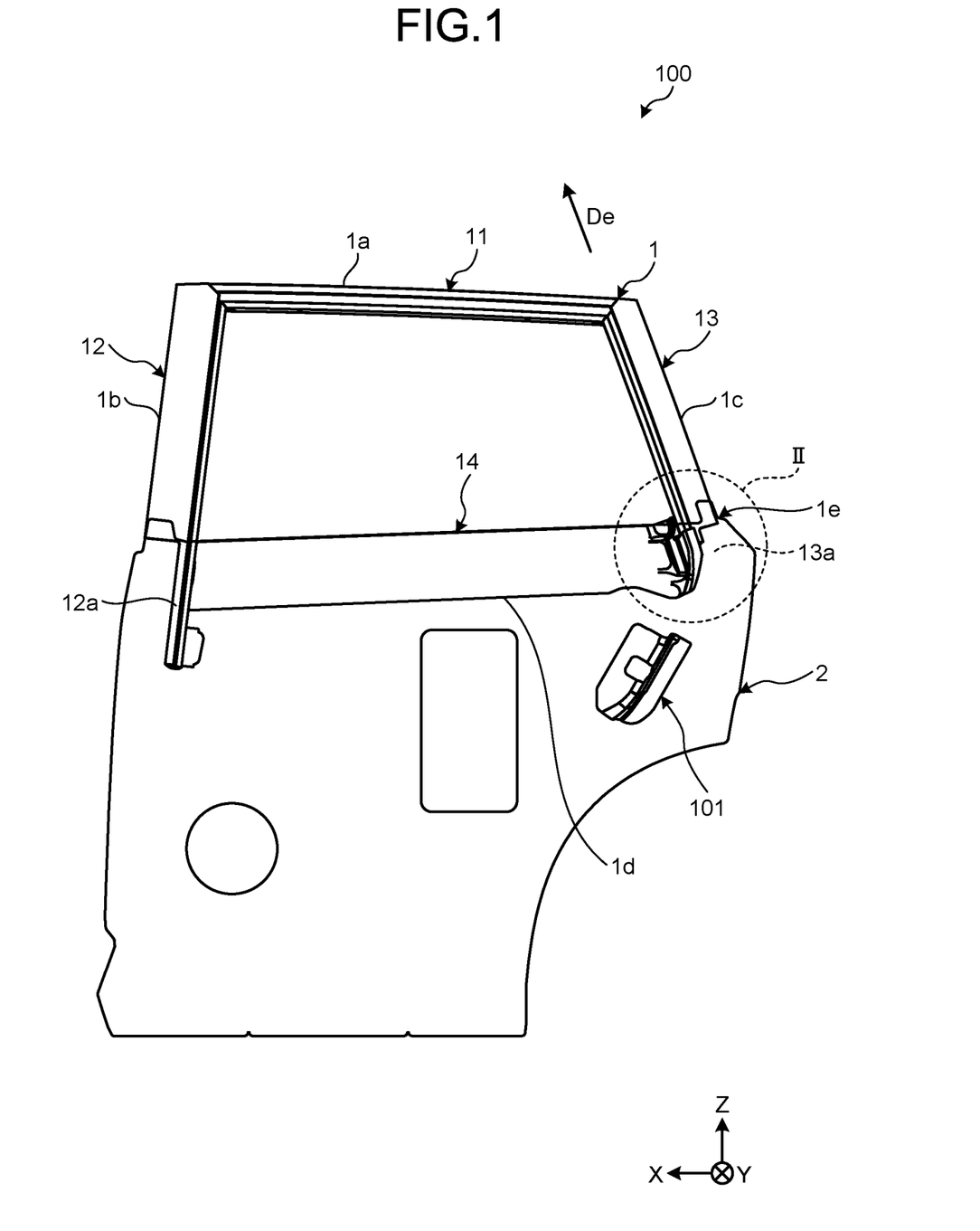
FIG. 1 is a schematic and exemplary side view of a vehicle door in an embodiment when viewed from the inside of a vehicle in a lateral direction.

FIG. 1 is a side view of a rear door 100 when viewed from the inside of the vehicle in the lateral direction. As illustrated in FIG. 1, the rear door 100 includes a rear door frame 1 and a door panel 2.

The rear door frame 1 includes an upper frame 11, a front pillar 12, a rear pillar 13, and a waist reinforcement 14. The upper frame 11 forms an upper edge 1a of an opening for a window panel, the front pillar 12 forms a front edge 1b of the opening, the rear pillar 13 forms a rear edge 1c of the opening, and the waist reinforcement 14 forms a lower edge 1d of the opening. The rear door frame 1 is an example of a vehicle door frame.

The upper frame 11, the front pillar 12, the rear pillar 13, and the waist reinforcement 14 are made of a metallic material such as an aluminum alloy or a ferrous material, for example. The rear pillar 13 can be made of an aluminum alloy by extrusion molding, for example. The waist reinforcement 14 can be made of a single or multiple metallic sheets by bending and bonding, for example. The upper frame 11, the front pillar 12, the rear pillar 13, and the waist reinforcement 14 are, however, not limited to such examples, and may be any of an extrusion molded component, a bending formed component, and a casted component.

The lower end of the rear pillar 13 and the rear end of the waist reinforcement 14 are bonded together by welding. The front pillar 12 includes a stationary part 12a and the rear pillar 13 includes a stationary part 13a in their bottom parts. The stationary parts 12a and 13a are bonded to the door panel 2 by welding, for example. The stationary parts 12a and 13a may be also referred to as brackets.

Figure 2:
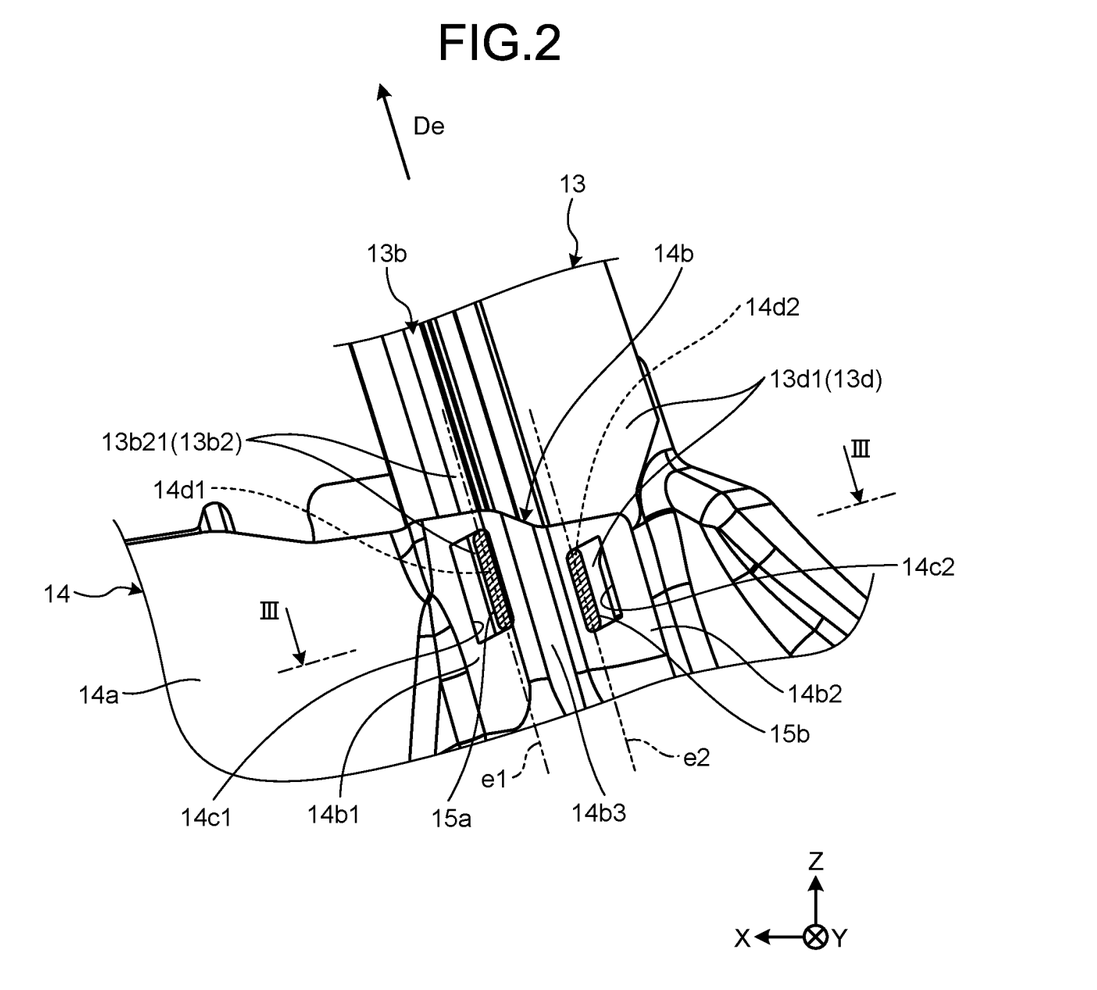
FIG. 2 is a schematic and exemplary perspective view of part II of the vehicle door frame in FIG. 1 in a first embodiment.
Figure 3:
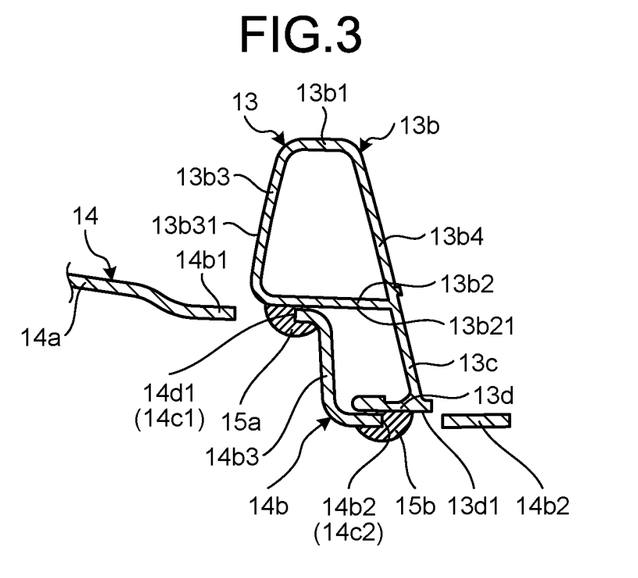
FIG. 3 is a cross-sectional view taken along line III-III in FIG. 2.

FIG. 2 is a perspective view of part II of the rear door frame 1 in FIG. 1 in the first embodiment, when viewed from the inside of the vehicle in the lateral direction. FIG. 3 is a cross-sectional view taken along line III-III in FIG. 2.

As illustrated in FIG. 2, the rear pillar 13 extends substantially in the vertical direction at the lower rear corner. Specifically, the rear pillar 13 extends rearward as extending downward, and is slightly tilted with respect to the vertical direction. The rear pillar 13 is formed of an aluminum alloy by extrusion molding, for example. A cross-sectional shape of the rear pillar 13 intersecting a longitudinal direction is thus substantially the same as that illustrated in FIG. 3 regardless of the position of the rear pillar 13 in the longitudinal direction (direction De). The rear pillar 13 is an exemplary pillar.

As illustrated in FIG. 3, the rear pillar 13 includes a closed cross section 13b, a first rear wall 13c, and a first inner wall 13d. The closed cross section 13b includes an outer wall 13b1, a second inner wall 13b2, a front wall 13b3, and a second rear wall 13b4. The first rear wall 13c is adjacent to the inside of the second rear wall 13b4 of the closed cross section 13b in the vehicle lateral direction. The first rear wall 13c and the second rear wall 13b4 are substantially flush and continuous with each other. The first rear wall 13c and the second rear wall 13b4 extend substantially in the vehicle lateral direction. Specifically, the first rear wall 13c and the second rear wall 13b4 extend rearward as extending inward in the vehicle lateral direction, and is slightly tilted with respect to the vehicle lateral direction. The first inner wall 13d is located more inside than the second inner wall 13b2 in the vehicle lateral direction. The outer wall 13b1 is located more outside than the second inner wall 13b2 in the vehicle lateral direction. The first inner wall 13d, the second inner wall 13b2, and the outer wall 13b1 are substantially in parallel with one another, and extend substantially in the longitudinal direction. The first inner wall 13d extends frontward from the inner end of the first rear wall 13c in the vehicle lateral direction. The first rear wall 13c and the first inner wall 13d form a substantially L-shaped cross-section.

As illustrated in FIG. 1, the waist reinforcement 14 has a constant width vertically and extends substantially in the longitudinal direction. As illustrated in FIGS. 2 and 3, the waist reinforcement 14 includes an extension 14a extending substantially in the longitudinal direction, and an attachment part 14b located at the rear end of the extension 14a. The attachment part 14b includes a front part 14b1, a rear part 14b2, and a connection 14b3. The attachment part 14b is bent in a crank form and extends substantially along the inside of the bottom end of the rear pillar 13 in the vehicle lateral direction. In at least the upper part of the attachment part 14b, the front part 14b1 extends along the inside of the second inner wall 13b2 of the rear pillar 13 in the vehicle lateral direction, and the rear part 14b2 extends substantially along the inside of the first inner wall 13d of the rear pillar 13 in the vehicle lateral direction. The connection 14b3 connects the rear end of the front part 14b1 and the front end of the rear part 14b2, and intersects the longitudinal direction. As can be seen in FIG. 3, the extension 14a extends rearward from the front pillar 12 (FIG. 1), in other words, extends toward a front surface 13b31 of the front wall 13b3 of the rear pillar 13. The attachment part 14b extends rearward from the rear end of the extension 14a across the front surface 13b31. The front surface 13b31 forms part of the inner periphery of the door frame. The front surface 13b31 is an example of an inner periphery. The waist reinforcement 14 is an example of a bridging member. The extension 14a is an example of a first extension. The attachment part 14b is an example of a second extension.

As illustrated in FIGS. 2 and 3, the attachment part 14b is provided with a plurality openings 14c1 and 14c2. An edge 14d1 of the opening 14c1 and an edge 14d2 of the opening 14c2 are bonded to the rear pillar 13 by welding such as fillet welding.

The front-side opening 14c1 is located in the front part 14b1 of the attachment part 14b. The front part 14b1 extends along the inside of the second inner wall 13b2 of the rear pillar 13 in the vehicle lateral direction, so that the second inner wall 13b2 is exposed to the inside through the opening 14c1 in the vehicle lateral direction. The opening 14c1 is a long, narrow, quadrangular or rectangular through hole (hole), extending substantially in the direction De. In this structure, the rear edge 14d1 of the opening 14c1 and an inner surface 13b21 of the second inner wall 13b2 of the rear pillar 13 are welded together. A weld bead 15a resulting from the welding extends at a certain width substantially along the edge 14d1, in other words, substantially in the direction De.

The rear-side opening 14c2 is located in the rear part 14b2 of the attachment part 14b. The rear part 14b2 extends along the inside of the first inner wall 13d of the rear pillar 13 in the vehicle lateral direction, so that the first inner wall 13d is exposed to the inside through the opening 14c2 in the vehicle lateral direction. The opening 14c2 is a long, narrow, quadrangular or rectangular through hole (hole), extending substantially in the direction De. In this structure, the front-side edge 14d2 of the opening 14c2 and an inner surface 13d1 of the first inner wall 13d of the rear pillar 13 are welded together. A weld bead 15b resulting from the welding extends at a certain width substantially along the edge 14d2, in other words, substantially in the direction De.

As is apparent from FIGS. 2 and 3, the weld beads 15a and 15b are spaced from each other in the longitudinal direction and the vehicle lateral direction. The weld beads 15a and 15b are located apart from the other weld beads 15b and 15a, and apart from their extension lines e2 and e1, respectively. That is, the weld bead 15a is apart from the other weld bead 15b and the extension line e2 of the other weld bead 15b, and the weld bead 15b is apart from the other weld bead 15a and the extension line e1 of the other weld bead 15a.

According to the present embodiment, as described above, the rear pillar 13 (pillar) and the waist reinforcement 14 (bridging member) are bonded together by the weld beads 15a and 15b. The weld beads 15a and 15b are located apart from the other weld beads 15b and 15a and from the extension lines e2 and e1 of the other weld beads 15b and 15a, respectively. That is, the weld bead 15a is apart from the other weld bead 15b and the extension line e2 of the other weld bead 15b, and the weld bead 15b is apart from the other weld bead 15a and the extension line e1 of the other weld bead 15a. Such a structure can be improved in stiffness and strength at the joint, as compared with the one bonded by a single weld bead, for example. If the extension line e1 of the weld bead 15a and the extension line e2 of the weld bead 15b overlap (coincide) with each other, that is, if the weld beads 15a and 15b overlap on substantially a straight line, the stiffness and strength around the weld beads 15a and 15b against bending moments may be weakened. In this regard, according to the present embodiment, the weld beads 15a and 15b are apart from the other weld beads 15b and 15a and from the other extension lines e2 and e1, respectively. The present embodiment can thus avoid decrease in the stiffness and strength against the bending moments. The number of the weld beads 15a and 15b may be set to three or more.

In the present embodiment, the weld beads 15a and 15b are spaced from each other in the longitudinal direction and the vehicle lateral direction. According to such a structure, the locations of the weld beads 15a and 15b can be set further away from each other, further improving in stiffness and strength against the bending moments.

In the present embodiment, the weld bead 15b bonds the rear pillar 13 and the attachment part 14b (second extension) extending from the extension 14a (first extension) across the front surface 13b31 (inner circumference) of the rear pillar 13. According to such a structure, it is possible to relatively simply set the weld beads 15a and 15b in separate locations at least in the longitudinal direction, for example.

In the present embodiment, the weld bead 15a bonds the rear pillar 13 and the edge 14d1 of the opening 14c1 formed in the attachment part 14b of the waist reinforcement 14. The weld bead 15b bonds the rear pillar 13 and the edge 14d2 of the opening 14c2 formed in the attachment part 14b of the waist reinforcement 14. According to such a structure, the openings 14c1 and 14c2 formed in the attachment part 14b can work to relatively easily ensure welding locations by the weld beads 15a and 15b, for example. In the present embodiment, the openings 14c1 and 14c2 are long, narrow holes of a minimal size sufficient for welding, making it possible to maintain a relatively high stiffness of the attachment part 14b. In the present embodiment, the edge 14d1 is the rear edge of the opening 14c1 while the edge 14d2 is the front edge of the opening 14c2 by way of example. The edges are not limited to such an example. The edge 14d1 may be the front edge of the opening 14c1. The edge 14d2 may be the rear edge of the opening 14c2.

In the present embodiment, as illustrated in FIG. 1, the rear door 100 is provided, separately from the rear pillar 13, with a lock bracket 101 to which a locking mechanism (not illustrated) is attached. The locking mechanism serves to lock the rear door 100 (vehicle door) to a vehicle body (not illustrated). The rear pillar 13 and the lock bracket 101, if united together, require a connecting part (bridging part) between the bottom end (stationary part 13a) of the rear pillar 13 and the lock bracket 101. This may increase the weight and thickness of the rear door frame 1 by the connecting part, for example. In this regard, in the present embodiment the rear pillar 13 and the lock bracket 101 are separated from each other, requiring no bridging part therebetween. The present embodiment can thus avoid an inconvenience involving with the connecting part. In the present embodiment, the weld beads 15a and 15b are substantially in parallel to each other by way of example, but are not limited to such an example. The weld beads 15a and 15b may be in a skew position. The extension lines e1 and e2 may overlap each other.

Second Embodiment

Figure 4:
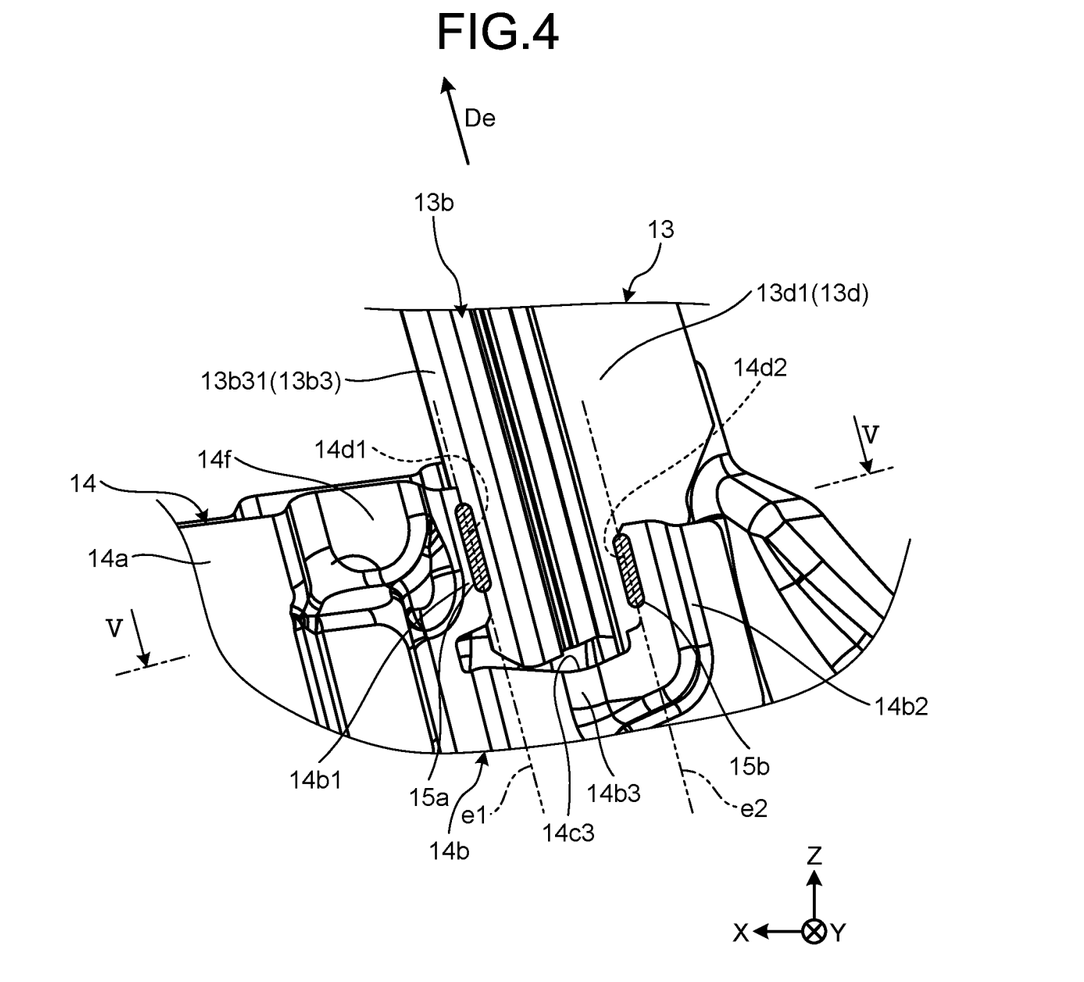
FIG. 4 is a schematic and exemplary perspective view of part II of the vehicle door frame in FIG. 1 in a second embodiment.
Figure 5:
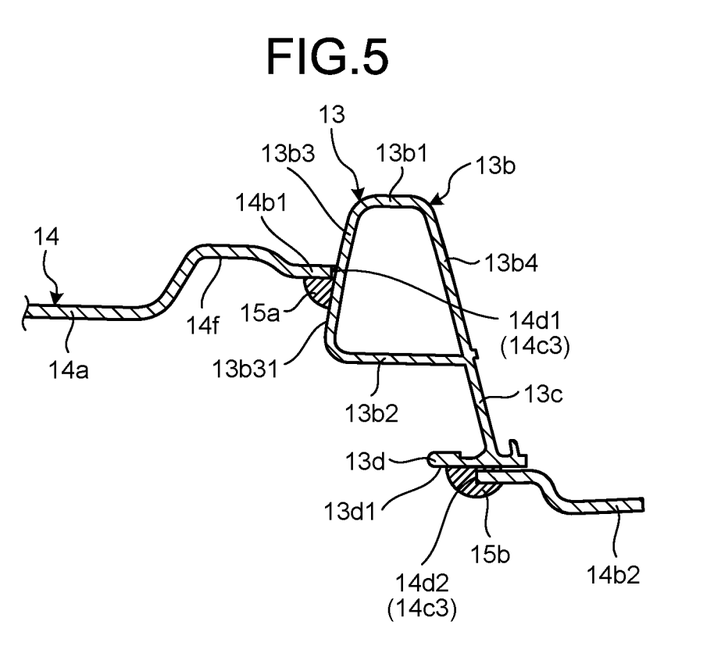
FIG. 5 is a cross-sectional view taken along line V-V in FIG. 4.

FIG. 4 is a perspective view of part II of the rear door frame 1 in FIG. 1 in a second embodiment when viewed from the inside of the vehicle in the lateral direction. FIG. 5 is a cross-sectional view taken along line V-V in FIG. 4.

In the second embodiment, the attachment part 14b is provided with a single opening 14c3 instead of the two openings 14c1 and 14c2. The opening 14c3 is a cutout cut downward from an upper edge 14e of the attachment part 14b.

The front part 14b1 of the attachment part 14b is adjacent to the front side of the front surface 13b31 of the front wall 13b3 of the rear pillar 13, and the rear end (rear edge) of the front part 14b1, in other words, the front edge 14d1 of the opening 14c3, abuts on the front surface 13b31. In this structure, the front edge 14d1 and the front surface 13b31 are welded together. The weld bead 15a resulting from the welding extends at a certain width substantially along the edge 14d1, i.e., substantially in the direction De. In the present embodiment, the extension 14a and the front part 14b1 are an example of a first extension, and the edge 14d1 is an example of an end.

The rear part 14b2 of the attachment part 14b extends substantially along the inside of the first inner wall 13d of the rear pillar 13 in the vehicle lateral direction. In this structure, the rear edge 14d2 of the opening 14c3 and the inner surface 13d1 of the first inner wall 13d of the rear pillar 13 are welded together. The weld bead 15b resulting from the welding extends at a certain width substantially along the edge 14d2, i.e., substantially in the direction De.

The connection 14b3 of the attachment part 14b is located at the lower side of the opening 14c3, that is, in the lower part (lower half) of the attachment part 14b, to connect the front part 14b1 and the rear part 14b2. In the present embodiment, the connection 14b3 and the rear part 14b2 are an exemplary second extension.

In the present embodiment, the weld beads 15a and 15b are separated from the other weld beads 15b and 15a, and from the other extension lines e2 and e1, respectively.

In the present embodiment, the edge 14d1 (end) of the front part 14b1 (first extension) abuts the front surface 13b31 (inner circumference) of the rear pillar 13, and the weld bead 15a bonds the edge 14d1 and the front surface 13b31 together. According to such a structure, the bonded part by the weld bead 15a between the rear pillar 13 and the waist reinforcement 14 can be improved in stiffness and strength.

In the present embodiment, the opening 14c3 is a cutout larger in size than the openings 14c1 and 14c2 in the first embodiment. The opening 14c3 may thus be a cutout. The structure of the present embodiment is effective when it is desirable that the attachment part 14b have a relatively low stiffness, for example, lower than the attachment part 14b of the first embodiment.

Third Embodiment

Figure 6:
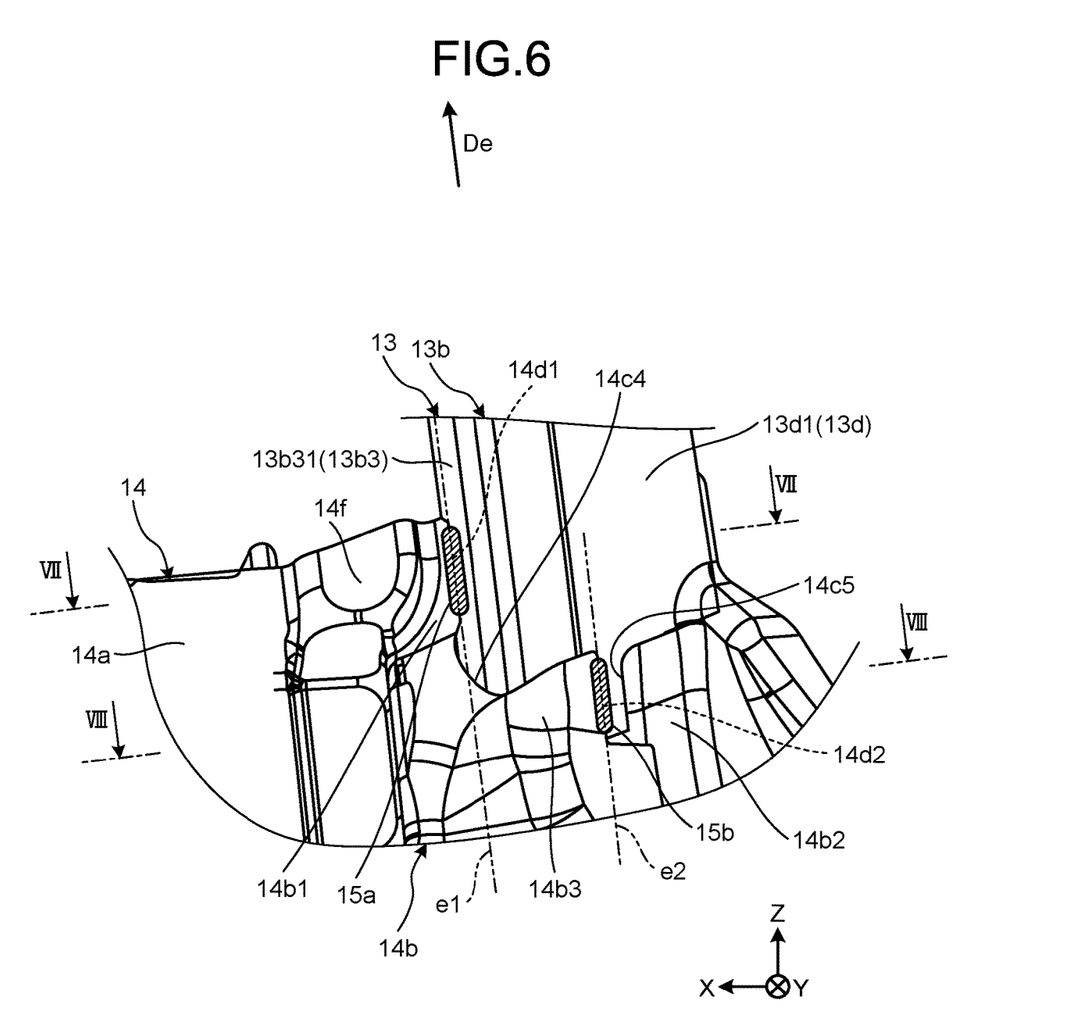
FIG. 6 is a schematic and exemplary perspective view of part II of the vehicle door frame in FIG. 1 in a third embodiment.
Figure 7:
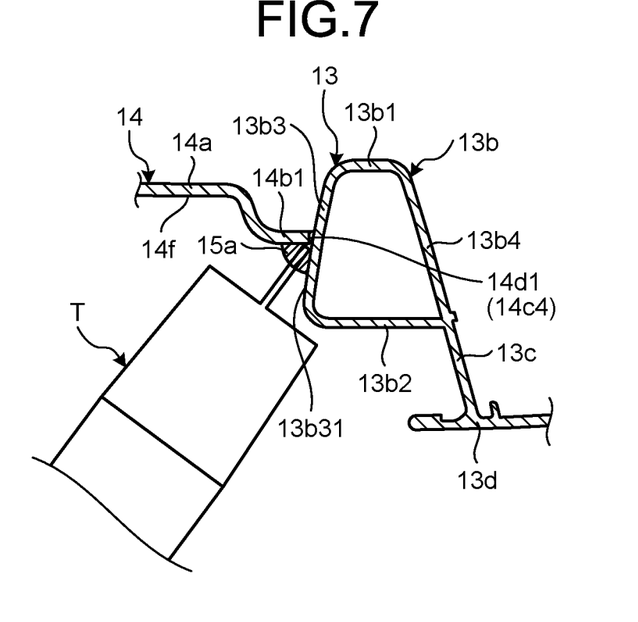
FIG. 7 is a cross-sectional view taken along line VII-VII in FIG. 6.
Figure 8:
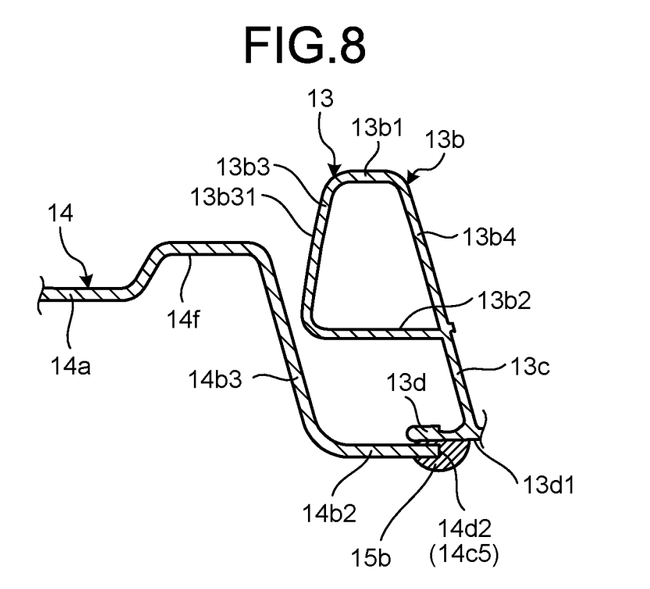
FIG. 8 is a cross-sectional view taken along line VIII-VIII in FIG. 6.

FIG. 6 is a perspective view of part II of the rear door frame 1 in FIG. 1 in a third embodiment when viewed from the inside of the vehicle in the lateral direction. FIG. 7 is a cross-sectional view taken along line VII-VII in FIG. 6. FIG. 8 is a cross-sectional view taken along line VIII-VIII in FIG. 6.

In the third embodiment, the attachment part 14*b* is provided with two connected openings 14*c*4 and 14*c*5 instead of the openings 14*c*1, 14*c*2, and 14*c*3. The opening 14*c*4 is a cutout cut from the top corner of the attachment part 14*b*. The opening 14*c*5 is a slit-like cutout cut downward from a lower edge 14*c*41 of the opening 14*c*4.

In the present embodiment as in the second embodiment, the front part 14*b*1 of the attachment part 14*b* is adjacent to the front side of the front surface 13*b*31 of the front wall 13*b*3 of the rear pillar 13. The rear end (rear edge) of the front part 14*b*1, i.e., the front edge 14*d*1 of the opening 14*c*4, abuts on the front surface 13*b*31. In this structure, the front edge 14*d*1 and the front surface 13*b*31 are welded together. The weld bead 15*a* resulting from the welding extends at a certain width substantially along the edge 14*d*1, in other words, substantially in the direction De. In the present embodiment, the edge 14*d*1 is an exemplary end.

The attachment part 14*b* is provided with a recess 14*f*, recessed outward in the vehicle lateral direction, in the boundary between the extension 14*a* and the front part 14*b*1. The recess 14*f* serves to prevent a welding torch T and the front part 14*b*1 from mutually interfering at the time of welding the edge 14*d*1 and the front surface 13*b*31.

The rear part 14*b*2 of the attachment part 14*b* is located below the opening 14*c*4, and extends substantially along the inside of the first inner wall 13*d* of the rear pillar 13 in the vehicle lateral direction. The rear part 14*b*2 is provided with the opening 14*c*5. In the present embodiment, the rear part 14*b*2 extends along the inside of the first inner wall 13*d* of the rear pillar 13 in the vehicle lateral direction, so that the first inner wall 13*d* is exposed to the inside through the opening 14*c*5 in the vehicle lateral direction. The opening 14*c*5 is a long, narrow, quadrangular or rectangular through hole (hole) extending downward from the lower edge 14*c*41 substantially in the direction De. In this structure, the front edge 14*d*2 of the opening 14*c*5 and the inner surface 13*d*1 of the first inner wall 13*d* of the rear pillar 13 are welded together. The weld bead 15*b* resulting from the welding extends at a certain width substantially along the edge 14*d*2, that is, substantially in the direction De. The opening 14*c*5 may be a through hole (hole) separated from the opening 14*c*4. The edge 14*d*2 may be the front edge of the opening 14*c*5.

The connection 14*b*3 of the attachment part 14*b* is located in the lower side of the opening 14*c*4, i.e., from the intermediate part to the bottom part of the attachment part 14*b*, to connect the front part 14*b*1 and the rear part 14*b*2.

In the present embodiment, the weld beads 15*a* and 15*b* are spaced from each other in the longitudinal direction, the vehicle lateral direction, and the vertical direction. In the present embodiment, the weld beads 15*a* and 15*b* are apart from the other weld beads 15*b* and 15*a* and from the other extension lines e2 and e1, respectively.

In the present embodiment as above, the weld beads 15*a* and 15*b* are spaced from each other in the longitudinal direction, the vehicle lateral direction, and the vertical direction. According to such an arrangement, The locations of the weld beads 15*a* and 15*b* can be set further away from each other, thereby further improving in stiffness and strength against the bending moments.

While certain embodiments have been described, these embodiments have been presented by way of example only, and are not intended to limit the scope of the inventions. Indeed, the embodiments described herein may be embodied in different other forms; various omissions, substitutions, combinations, and changes may be made without departing from the spirit of the inventions. These embodiments and modifications are incorporated in the scope and spirit of the inventions and in the accompanying claims and their equivalents. Specifications of the elements and shapes (structure, kind, direction, form, size, length, width, thickness, height, number, arrangement, position, location, material, etc.) can be modified and carried out as appropriate.

The invention claimed is:

1. A vehicle door frame, comprising:
 a pillar; and
 a bridging member connected to a lower part of the pillar and extending in a longitudinal direction of a vehicle, wherein
 the pillar and the bridging member are bonded together by a plurality of weld beads,
 each of the weld beads is apart from another weld bead and from an extension line of the another weld bead,
 the pillar has an inner circumference that forms a part of an inner periphery of the vehicle door frame,
 the bridging member includes:
 a first extension extending toward the inner circumference, and
 a second extension extending from the first extension across the inner circumference, and
 at least one of the weld beads bonds the pillar and the second extension together.

2. The vehicle door frame according to claim 1, wherein the plurality of weld beads is spaced from each other in at least one of the longitudinal direction and a lateral direction and a vertical direction of the vehicle.

3. The vehicle door frame according to claim 1, wherein the first extension has an end that abuts the inner circumference, and
 at least one of the plurality of weld beads bonds the inner circumference and the end together.

4. The vehicle door frame according to claim 3, wherein the first extension is provided with a recess, the recess being adjacent to a front side of the weld bead bonding the pillar and the first extension, and recessed outward in the lateral direction of the vehicle.

5. The vehicle door frame according to claim 1, wherein the bridging member is provided with a cutout or a hole, and
 at least one of the weld beads bonds the pillar and an edge of the cutout or an edge of the hole together.

6. The vehicle door frame according to claim 1, further comprising
 a lock bracket separated from the pillar, and to which a locking mechanism is attached, the locking mechanism that locks a vehicle door to a vehicle body.

* * * * *